US005330562A

United States Patent [19]

Anderson

[11] Patent Number: 5,330,562

[45] Date of Patent: Jul. 19, 1994

[54] FLUIDIZED BED SCRUBBER FOR USE IN GAS CLEANING SYSTEM

[75] Inventor: Robert J. Anderson, Lakeland, Fla.

[73] Assignee: Medx, Inc., Miami, Fla.

[21] Appl. No.: 31,658

[22] Filed: Mar. 12, 1993

[51] Int. Cl.[5] ........................ B01D 5/00; B01D 51/00; B01D 53/34

[52] U.S. Cl. ........................................ 95/108; 95/109; 96/150; 422/145; 422/146; 422/177

[58] Field of Search ................. 95/108, 109, 131, 132, 95/133; 96/150, 151; 422/145, 146, 177, 139; 34/57 A

[56] References Cited

U.S. PATENT DOCUMENTS

| | | | |
|---|---|---|---|
| 2,493,911 | 1/1950 | Brandt | 95/109 |
| 2,601,298 | 6/1952 | Keith | 95/108 |
| 3,700,421 | 10/1972 | Johnson et al. | 422/139 |
| 3,977,846 | 8/1976 | Russell et al. | 95/108 |
| 4,176,019 | 11/1979 | Dethloff | 95/131 |
| 4,428,771 | 1/1984 | Nowak et al. | 95/133 |
| 4,477,335 | 10/1984 | Benslay | 422/147 |
| 4,556,540 | 12/1985 | Benslay | 422/142 |
| 4,664,887 | 5/1987 | Engström | 422/147 |
| 5,019,137 | 5/1991 | Ruottu | 95/108 |
| 35943,652 | 8/1990 | Hadley | 55/97 |

OTHER PUBLICATIONS

Trexler, Kathy "The Use of Scrubbers in Controlling Air Emissions", *FOCUS*, vol. 6, Issue 1, p. 5, Jan./Feb. 1991; Consulting Services, Inc., Exton, Pa.

E. B. Mull, Jr. "Dry Additive Process for Control of Acid Gas & Particulate Emissions", *A.S.M. E. West Chapter Meeting*, Apr. 13–14, 1988; Salt Lake City, Utah.

Aeropulse, Inc.'s brochure, "AeroScrub Emuission Control Systems", Bensalem, Pa.

ETS, Inc.'s brochure, "ETS Dry Acid Gas Reactor System", Roanoke, Va.

Torit's brochure, "Mimi-Scrubber".

Bundy Environmental Technology, Inc.'s brochure "Dry Scrubber", Pickerington, Ohio.

Advanced Concepts Incorporated's brochure "Hot Gas Fume Scrubbers", San Diego, Calif.

"Moving Bed Scrubbers", *Pollution Engineering Practice Handbook*, p. 138, 1975.

R. Turton and O, Levenspiel, "Powder Technology", vol. 53, pp. 127–129, 1987, The Netherlands.

T. C. Ho, C. Chen, and J. R. Hopper, "Characteristics of Metal Capture in Fluidized Bed Incinerators and Waste Heat Boilers", *Fluidization VII*, pp. 463–470.

*Primary Examiner*—Robert J. Warden
*Assistant Examiner*—L. M. Crawford
*Attorney, Agent, or Firm*—Leslie J. Lott & Assoc.

[57] ABSTRACT

A fluidized bed scrubber for use in gas cleaning systems, comprising means for introducing a quantity of polluted gas into a first chamber; means for removing a portion of the pollutants from the polluted gas in the first chamber; means for introducing the polluted gas into a second chamber; and means for removing additional pollutants from the polluted gas in the second chamber. The invention also provides an improved method for cleaning polluted gas, comprising the steps of passing the polluted gas from a combustion source through a fluidized bed scrubber, removing a plurality of pollutants within the fluidized bed scrubber, passing the fluidized gas through a reactor, passing the fluidized gas through a filter in order to remove further quantities of pollutants, and emitting the now-clean gas into the atmosphere.

13 Claims, 1 Drawing Sheet

FLUIDIZED BED SCRUBBER FOR USE IN GAS CLEANING SYSTEM

TECHNICAL FIELD

This invention relates generally to gas cleaning systems, and this invention specifically relates to an improved system which utilizes a fluidized bed scrubber for effectively removing pollutants from gases.

BACKGROUND OF THE INVENTION

The 1990 Amendments to the Clean Air Act, along with a variety of related state laws, include numerous requirements related to air emissions for all types of sources. Among the methods utilized in complying with the provisions of the amended Clean Air Act is the use of scrubbers. To reduce air pollution emissions, the polluted gas is passed through a control device or system which "cleans" the gas by collecting the pollutant. Clean gas can then be safely released into the atmosphere. Scrubbers are a control device or system which effectively "clean" polluted gas prior to emission. Trexler, Kathy, *THE USE OF SCRUBBERS IN CONTROLLING AIR EMISSIONS, FOCUS* (a publication of Consulting Services Inc., One East Uwchlan Avenue, Suite 310, Exton, Pa., 19341), Volume 6, Issue 1, January/February 1991, page 5.

There are a number of prior art gas cleaning systems, such as those described in U.S. Pat. No. 4,949,652, to Hadley; U.S. Pat. No. 4,664,887, to Engstrom; and U.S. Pat. No. 3,700,421, to Johnson et al., each of which is incorporated herein by reference. Additionally, a prior art gas cleaning system is described in a paper presented at the Western Chapter Meeting of the American Society of Mechanical Engineers (Solid Waste Division), in Salt Lake City, Utah, on Apr. 13-14, 1988, by E. B. Mull, Jr. and Heinz P. Beutner, both of Interel Corporation, Englewood, Colo., entitled DRY ADDITIVE PROCESS FOR CONTROL OF ACID GAS AND PARTICULATE EMISSIONS, also incorporated herein by reference.

One type of scrubber is known as a fluidized bed scrubber. A fluidized bed is created by flowing a gas through a solid, such as sand. As a result of the pressurized gas flowing through the sand, the sand expands and takes on the characteristics of a fluid. Although the sand remains a dry solid, it has the characteristics of a liquid. The use of a fluidized bed is an effective of cleaning gases because the fluidized bed serves to contact pollutants which are cooled off of the gas. However, a disadvantage associated with the use of a fluidized bed scrubber is the extremely high pressure required to fluidize the bed. For example, a typical fluidized bed is 5 or 6 feet deep and requires 1.5 inches per water column (w.c.) pressure drop per inch of bed depth. Thus, a pressure loss of over 3 pounds per square inch (p.s.i.) would be required, an impractical requirement for atmospheric pressure systems.

None of the devices or systems described in the above-referenced prior art teaches the use of a fluidized bed scrubber that does not require extremely high pressures in order to fluidize the bed. Furthermore, the mechanical equipment utilized in the prior art devices or systems is sensitive to corrosion when contacted by the pollutants removed from the gases. As a result thereof, the costs associated with maintenance and/or replacement of the mechanical equipment must be taken into account in determining whether to utilize such devices or systems.

Thus, there is a need in the art for a gas cleaning system which utilizes a fluidized bed scrubber in order to effectively remove pollutants from the gas at atmospheric pressure.

There is an additional need in the art for a fluidized bed scrubber which does not require high pressures in order to sufficiently fluidize the bed.

There is an additional need in the art for a gas cleaning system which does not require frequent maintenance and/or replacement of mechanical equipment associated therewith.

SUMMARY OF THE INVENTION

The present invention fulfills the need in the art. Broadly described, the present invention provides a fluidized bed scrubber for use in gas cleaning systems.

In a preferred embodiment of the present invention, the fluidized bed scrubber comprises means for introducing a quantity of polluted gas into a first chamber; means for removing a portion of the pollutants from the polluted gas in the first chamber; means for introducing the polluted gas into a second chamber; and means for removing additional pollutants from the polluted gas in the second chamber.

In the preferred embodiment of the present invention, the means for removing pollutants in the first chamber comprises introducing a quantity of fluidized solids into the first chamber so as to cool the polluted gas and cause a quantity of pollutants to condense upon the fluidized solids.

In the preferred embodiment of the present invention, the means for removing pollutants in the second chamber comprises further cooling the polluted gas so as to cause a second quantity of pollutants to condense upon the fluidized solids.

The preferred embodiment of the present invention also provides an improved method for cleaning polluted gas, comprising the steps of passing the polluted gas from a combustion source through a fluidized bed scrubber, removing a plurality of pollutants within the fluidized bed scrubber, passing the fluidized gas through a reactor, passing the fluidized gas through a filter in order to remove further quantities of pollutants, and emitting the now-clean gas into the atmosphere.

Accordingly, it is an object of the present invention to provide a fluidized bed scrubber for use in gas cleaning systems.

It is another object of the present invention to provide a fluidized bed scrubber which does not require high pressures in order to sufficiently fluidize the bed.

It is another object of the present invention to provide a fluidized bed scrubber which does not require frequent maintenance and/or replacement of mechanical equipment associated therewith.

It is another object of the present invention to provide an improved method for cleaning polluted gas.

It is another object of the present invention to provide an improved method for cleaning polluted gas, the improved method including the use a fluidized bed scrubber.

It is another object of the present invention to provide an improved method for cleaning polluted gas, the improved method including the use a fluidized bed scrubber which does not require high pressures in order to sufficiently fluidize the bed.

It is another object of the present invention to provide an improved method for cleaning polluted gas, the improved method including the use a fluidized bed scrubber which does not require frequent maintenance and/or replacement of mechanical equipment associated therewith.

These and other objects, features, and advantages of the present invention may be more clearly understood and appreciated from a review of the following detailed description of the disclosed embodiment and by reference to the appended drawings and claims.

BRIEF DESCRIPTION OF THE DRAWING FIGURES

DETAILED DESCRIPTION OF THE PREFERRED EMBODIMENT

Figure 1:
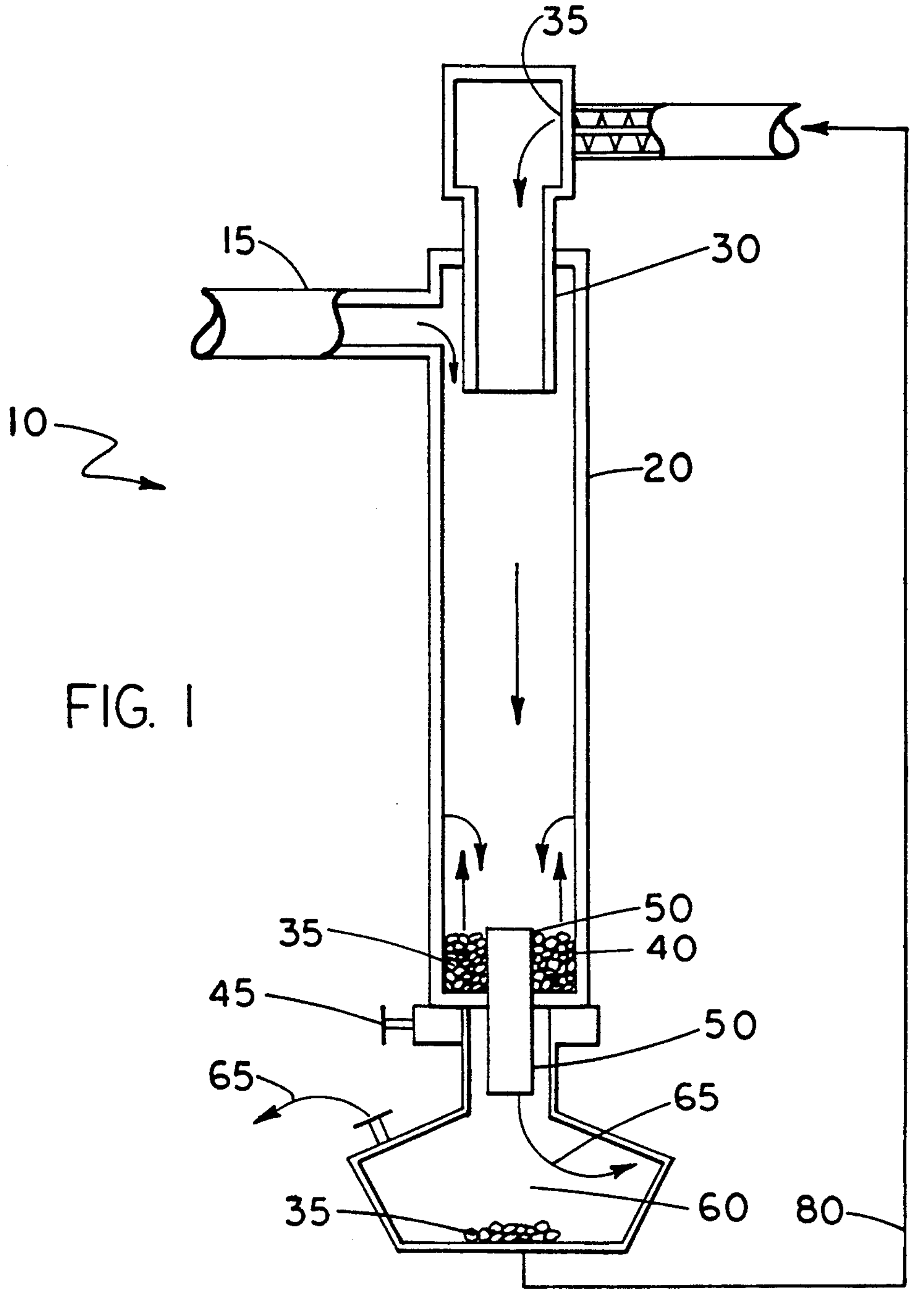
FIG. 1 is a pictorial illustration of the preferred embodiment of the fluidized bed scrubber of the present invention.

Referring now to the drawings, in which like numerals indicate like elements throughout the several views, FIG. 1 illustrates the fluidized bed scrubber 10 of the present invention. The fluidized bed scrubber 10 includes a passage 15 through which polluted gas is introduced into a first chamber 20. Prior to introduction into the first chamber 20, the temperature of the polluted gas is approximately 2000° Fahrenheit. The pollutants present in the polluted gas typically include vaporized sodium salts, such as sodium chloride, and a variety of metals, such as lead, cadmium, arsenic, and mercury.

The fluidized bed scrubber 10 also includes a second passage 30 through which a plurality of recycled fluidized solids 35 is introduced into the first chamber 20. The fluidized solids 35 are created as follows. A fluidized bed 40 is located near the bottom end of the first chamber 20. Using technology well-known in the art, a quantity of solids 35 is fluidized by flowing a quantity of gas through a series of tubes 45 and then through the solids 35. The passage 15 introduces the polluted gas into the first chamber 20 above the fluidized bed 40. The second passage 30 is located above the fluidized bed 40. The recycled fluidized solids 35 that are introduced into the first chamber 20 through the second passage 30 are injected into the first chamber 20 in a downward stream toward the fluidized bed 40. Using the polluted gas, at 2000° Fahrenheit, to fluidize the solids 35, as is currently taught by the industry, would require extremely high pressures of 10–20% of the volume of the primary treated gas. However, through the use of a second supply of gas to fluidize the solids, introduced through the tubes 45, the amount of pressure required for the primary gas is significantly decreased, to approximately 2 inches w.c.

The temperature of the fluidized solids is approximately 400° Fahrenheit. The polluted gas and the fluidized solids 35 are mixed together in the first chamber 20 as they pass through a downcomer 50. As a result of the mixing, the temperature of the polluted gas decreases to approximately 1100° Fahrenheit. The lower temperature is below the condensation point of the vaporized sodium salts in the polluted gas and, accordingly, the vaporized sodium salts bond to the fluidized solids 35. The bonding occurs by means familiar to those skilled in the art, such as condensation, adsorption, absorption, or other chemical reaction.

Figure 2:
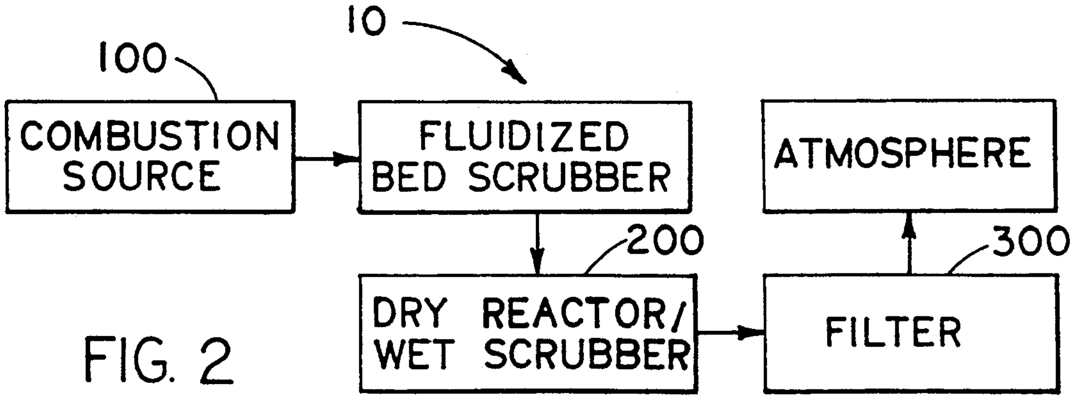
FIG. 2 is a block diagram illustrating the steps of the improved gas cleaning method of the present invention.

From the first chamber 20, the combination of polluted gas and fluidized solids 35, collectively referred to as the treated gas, travels through the downcomer 50 into a second chamber 60. The temperature of the treated gas is then lowered from approximately 1100° Fahrenheit to approximately 500° Fahrenheit, a temperature which is sufficiently low for the metals contained in the polluted gas to condense upon the fluidized solids 35, by the addition of a coolant. The treated gas, from which both vaporized sodium salts and metals have now been removed, is then passed to the next step in the gas cleaning process, as illustrated in FIG. 2. Accelerated through the downcomer 50 by gravity and the inertia created by the downward injection of fluidized solids 35 that come through the second passage 30, the fluidized solids 35 collect at the bottom of the second chamber 60. The fluidized solids 35 are recycled for further use in the fluidized bed scrubber 10 by passing them back to the second passage 30 along path 80. After the fluidized solids 35 have passed through the scrubber 10 a sufficient number of times to no longer be useful in collecting pollutants from the polluted gas, the fluidized solids are replaced.

Looking next at FIG. 2, the general steps taken in the improved gas cleaning system of the present invention may be seen. Polluted gas from a medical waste incinerator or other combustion source 100 is conveyed to the fluidized bed scrubber 10 detailed in FIG. 1. After the polluted gas is treated in the fluidized bed scrubber 10, the treated gas is passed to a reactor 200 for further treatment. The reactor 200 may be either a dry reactor or a wet scrubber, both of which are well-known in the gas cleaning industry. After treatment in the reactor 200, the treated gas is next passed to a filter 300 for further removal of pollutants. The filter 300 is of the type capable of collecting submicron-sized particles of pollutants and functions to collect any particles not removed from the gas by the fluidized bed scrubber 10. The manufacture and specifications of the filter 300 are well-known in the gas cleaning industry. After passing through the filter 300, the treated gas is emitted into the atmosphere.

In an alternative embodiment of the present invention, the treated gas may be returned to the first chamber 20 from the second chamber 60, for removal of additional pollutants from the treated gas.

Accordingly, it will be understood that both the preferred and alternative embodiments of the present invention have been disclosed by way of example and that other modifications and alterations may occur to those skilled in the art without departing from the scope and spirit of the appended claims.

What is claimed is:

1. A fluidized bed scrubber for use in gas cleaning systems, comprising:

a first chamber;

a second chamber below said first chamber;

a fluidized bed, comprising fluidized solids, in said first chamber;

means for injecting a stream of fluidizing gas into said fluidized bed within said first chamber for maintaining the fluidized state of said fluidized solids;

a downcomer passing from within said first chamber into said second chamber;

means for introducing a quantity of polluted gas, comprising a plurality of pollutants and clean gas, into said first chamber above said downcomer;

means for injecting a stream of said fluidized solids into said first chamber above said downcomer such that said polluted gas and said fluidized solids are carried from said first chamber through said downcomer into said second chamber, and such that said fluidized solids mix with said polluted gas above and within said downcomer so as to condition said polluted gas such that said pollutants bond with said fluidized solids and are removed from said polluted gas; and means for removing a second portion of pollutants from said polluted gas.

2. The fluidized bed scrubber of claim 1, wherein said means for removing said second portion of pollutants comprises means for further cooling said polluted gas in said second chamber such that said second portion of pollutants bonds to said fluidized solids.

3. A method of using a fluidized bed scrubber in gas cleaning systems, comprising:

injecting a stream of fluidizing gas into a fluidized bed, which comprises fluidized solids and is located within a first chamber, for maintaining the fluidized state of said fluidized solids;

introducing a quantity of polluted gas, comprising a plurality of pollutants and clean gas, into said first chamber above a downcomer, which passes from within said first chamber into a second chamber below said first chamber;

injecting a stream of said fluidized solids into said first chamber above said downcomer such that said polluted gas and said fluidized solids are carried from said first chamber through said downcomer into said second chamber, and such that said fluidized solids mix with said polluted gas above and within said downcomer so as to condition said polluted gas such that said pollutants bond with said fluidized solids and are removed from said polluted gas; and removing a second portion of pollutants from said polluted gas.

4. The method of claim 3, wherein said step of removing said second portion of pollutants comprises further cooling said polluted gas in said second chamber such that said second portion of pollutants bonds to said fluidized solids.

5. The method of claim 3, further comprising the steps of:

passing said polluted gas from said fluidized bed scrubber through a reactor;

passing said polluted gas from said reactor through a filter in order remove an additional portion of pollutants; and emitting said polluted gas, from which a sufficient quantity of pollutants have been removed, into the atmosphere.

6. The method of claim 5, wherein said reactor is a dry reactor.

7. The method of claim 5, wherein said reactor is a wet scrubber.

8. A fluidized bed scrubber for use in gas cleaning systems, comprising:

a first chamber;

a second chamber below said first chamber;

a fluidized bed, comprising fluidized solids, in said first chamber;

means for injecting a stream of fluidizing gas into said fluidized bed within said first chamber for maintaining the fluidized state of said fluidized solids;

a downcomer passing from within said first chamber into said second chamber;

means for introducing a quantity of polluted gas, comprising a plurality of pollutants and clean gas, into said first chamber above said downcomer; and means for injecting a stream of said fluidized solids into said first chamber above said downcomer such that said polluted gas and said fluidized solids are carried from said first chamber through said downcomer into said second chamber, and such that said fluidized solids mix with said polluted gas above and within said downcomer so as to condition said polluted gas such that said pollutants bond with said fluidized solids and are removed from said polluted gas.

9. A fluidized bed scrubber for use in gas cleaning systems, comprising:

a first chamber;

a second chamber below said first chamber;

a fluidized bed, comprising fluidized solids, in said first chamber;

means for injecting a stream of fluidizing gas into said fluidized bed within said first chamber for maintaining the fluidized state of said fluidized solids;

a downcomer passing from within said first chamber into said second chamber;

means for introducing a quantity of polluted gas, comprising a plurality of pollutants and clean gas, into said first chamber above said downcomer;

means for injecting a stream of said fluidized solids into said first chamber above said downcomer such that said polluted gas and said fluidized solids are carried from said first chamber through said downcomer into said second chamber, and such that said fluidized solids mix with said polluted gas above and within said downcomer so as to condition said polluted gas such that said pollutants bond with said fluidized solids and are removed from said polluted gas;

means for removing a second portion of pollutants from said polluted gas; and means for selectively returning said polluted gas from said second chamber to said first chamber for further cleaning.

10. The fluidized bed scrubber of claim 9, wherein said means for removing said second portion of pollutants comprises means for further cooling said polluted gas in said second chamber such that said second portion of pollutants bonds to said fluidized solids.

11. A method for cleaning polluted gas, comprising the steps of:

passing said polluted gas from a combustion source through a fluidized bed scrubber, said fluidized bed scrubber comprising:

(i) a first chamber;

(ii) a second chamber below said first chamber;

(iii) a fluidized bed, comprising fluidized solids, in said first chamber;

(iv) means for injecting a stream of fluidizing gas into said fluidized bed within said first chamber for maintaining the fluidized state of said fluidized solids;

(v) a downcomer passing from within said first chamber into said second chamber;

(vi) means for introducing a quantity of polluted gas, comprising a plurality of pollutants and clean gas, into said first chamber above said downcomer; and (vii) means for injecting a stream of said fluidized solids into said first chamber above said downcomer such that said polluted gas and said fluidized solids are carried from said first chamber through said downcomer into said second chamber, and such that said fluidized solids mix with said polluted gas above and within said downcomer so as to condition said polluted gas such that said pollutants bond with said fluidized solids and are removed from said polluted gas;

removing said first portion of pollutants from said polluted gas within said fluidized bed scrubber;

passing said polluted gas from said fluidized bed scrubber through a reactor;

passing said polluted gas from said reactor through a filter in order remove an additional portion of pollutants; and emitting said polluted gas, from which a sufficient quantity of pollutants have been removed, into the atmosphere.

12. The method of claim 11, wherein said reactor is a dry reactor.

13. The method of claim 11, wherein said reactor is a wet scrubber.

* * * * *